(12) United States Patent
Delmotte et al.

(10) Patent No.: US 7,026,588 B2
(45) Date of Patent: Apr. 11, 2006

(54) MICROWAVE TREATMENT OF OBJECTS AND SINGLE-PIECE COMPONENTS

(75) Inventors: Michel Delmotte, Bourg la Reine (FR); Claude More, Paris (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 10/433,962

(22) PCT Filed: Dec. 7, 2001

(86) PCT No.: PCT/FR01/03890

§ 371 (c)(1),
(2), (4) Date: Nov. 18, 2003

(87) PCT Pub. No.: WO02/49397

PCT Pub. Date: Jun. 20, 2002

(65) Prior Publication Data

US 2004/0069775 A1    Apr. 15, 2004

(30) Foreign Application Priority Data

Dec. 11, 2000   (FR) ................................. 00 16089

(51) Int. Cl.
 *H05B 6/70*    (2006.01)
(52) U.S. Cl. ........................ 219/690; 219/691; 219/693

(58) Field of Classification Search ........ 219/679–700, 219/705, 709, 728–729, 730–731; 427/543, 427/553; 118/620–525
See application file for complete search history.

(56) References Cited

U.S. PATENT DOCUMENTS

| 3,749,874 A | * | 7/1973 | Edgar ........................ 219/699 |
| 4,570,045 A | * | 2/1986 | Jeppson ...................... 219/699 |
| 5,424,517 A | * | 6/1995 | Habeger et al. ............. 219/728 |
| 5,523,548 A | * | 6/1996 | Tsukagoshi et al. ........ 219/695 |
| 5,543,605 A | | 8/1996 | Snyder et al. |
| 6,072,167 A | * | 6/2000 | Lewis et al. ................. 219/690 |

FOREIGN PATENT DOCUMENTS

| EP | 0 122 840 | 9/1987 |
| FR | 2 650 775 | 2/1991 |

OTHER PUBLICATIONS

Theory Constants (http://www.sm.luth.se/~urban/master/Theory/b.html).*

* cited by examiner

*Primary Examiner*—Quang Van
(74) *Attorney, Agent, or Firm*—Young & Thompson

(57) ABSTRACT

The invention concerns a device for microwave treatment in an applicator (1), characterized in that it comprises, arranged in the applicator, impedance adapting dielectric means (2, 7, 8) having shapes and dimensions adapted to the objects (10) to be treated and to the characteristics of wave propagation modes.

22 Claims, 3 Drawing Sheets

MICROWAVE TREATMENT OF OBJECTS AND SINGLE-PIECE COMPONENTS

BACKGROUND OF THE INVENTION

The present invention relates to the microwave treatment in particular of items of farm produce or domestic objects or of industrial parts, and relates more particularly to devices of the aforementioned type intended for the microwave treatment of single parts.

DESCRIPTION OF THE RELATED ART

The microwave heating of single objects or of covered products generally leads to a clear structuring of the spatial distribution of the sources of heat of electromagnetic original and consequently to a structuring of the temperature distribution.

This spatial temperature distribution is the end result of the two contributory phenomena:
a) the reflections of the waves by the interfaces formed by the physical limits of the objects: these reflections are revealed by an interferential phenomenon in the form of an alternation of high-temperature zones and cold spots and concern objects of which the dimensions are of the order of magnitude of the wavelength;
b) the attenuation of the energy density supplied by the waves within the same objects: the attenuation is visible on objects of which the dimensions are great relative to the wavelength or of which the absorptive dielectric characteristic is high (above 1).

These two phenomena, reflection of the waves and attenuation, had been observed and studied in the laboratory on specific microwave devices known as applicators, always completely filled with various products or materials, these latter being the products to be transformed by heating or being dielectrics suitable for forming the specific charge of the applicators.

These applicators are always characterised by the presence of substantial masses of dielectric materials which serve as input and output interface adapters of the applicators or which permit the choice of suitable global attenuation coefficients.

These applicators are for example mould/applicators for the use of composite materials or autoclave/applicators for the particular heating of numerous reagents.

The most advanced contribution in terms of potential uses of the results of research in the laboratory is the demonstration and the possibility of evaluation of compensation for the attenuation of the waves.

Such compensation is achieved by the use of dielectric materials of variable thickness or permittivity characteristic in the direction of propagation, possibly formed by layers of different materials.

SUMMARY OF THE INVENTION

The invention concerns an application of the same fundamental concepts to the situation of objects of which the dimensions are in the range between a centimeter and at maximum of the order of a meter, placed in lightly-loaded monomode or multimode applicators.

It therefore relates to a device for microwave treatment of objects in an applicator, characterised in that it comprises, disposed in the applicator, dielectric impedance adaptation means having shapes and dimensions adapted to the objects to be processed and to the characteristics of the wave propagation modes.

According to other characteristics:
- the dielectric adaptation means are parts made from a dielectric material of which the permittivity is as close as possible to average permittivity of the objects to be heated;
- the dielectric adaptation means have volumes of prismatic, pyramidal or conical shape of which a base is equal to at least a part of a section of the object to be heated and of which the height is limited to the filling conditions of the applicator;
- the said dielectric means comprise tips forming interface adapters disposed relative to the object to be treated according to at least one of the three dimension in space;
- the dielectric adaptation means comprise a tube having a cylindrical internal cavity and an external shape having an intermediate rotational portion and two end portions in the shape of truncated cone tapering away from the rotational portion and, joined to the ends of the tube forming a propagation adapter, solid conical parts which form interface adapters;
- the intermediate rotational portion has a cylindrical external shape;
- the intermediate rotational portion is formed by truncated cones joined by the large bases or by their small bases;
- for the heating of parallelepipedal objects the device comprises at least one waveguide extended by a prismatic antenna disposed on the side of at least one face of at least one object and the dielectric adaptation means comprise a prismatic part accommodated in the said antenna, and the free surface of the prismatic dielectric part is situated in contact with the corresponding face of the parallelepipedal object to be heated;
- when the said at least one object is to remain accessible for other operations, an air gap is provided between the said adaptation means and the surface of the said object of parallelepipedal shape, the value of the said air gap being a function of the dielectric permittivities of the material of the part to be heated and of the dielectric adaptation means;
- the value of the air gap is less than or equal to a whole number of half-wavelengths of the propagation mode;
- the dielectric adaptation means comprise an intermediate portion of parallelepipedal shape in which an impression is provided for the object to be heated, and two prismatic tips which are joined by their bases to the ends of the intermediate portion and of which the ridges opposite the said bases are disposed transversely with respect to the direction of propagation of the waves with respect to the said dielectric adaptation means, the said prismatic tips forming interface adapters;
- in order to favour the propagation in the object to be heated, several dielectric materials of different permittivities are associated, thus creating a permittivity gradient;
- when the dielectric parts of the said adaptation means are formed by layers of different materials, it is the permittivity of the central layer which has a value close to that of the objects to be heated;
- it comprises, disposed in an applicator, a conveyor belt made from a material having a dielectric permittivity adapted to the objects to be treated, the said conveyor belt being displaceable in a gap defined by the interface adapter bases which are placed above and below the belt and have cells to receive objects to be treated by microwaves such as trays for food products.

BRIEF DESCRIPTION OF THE DRAWINGS

The invention will be better understood by reading the following description which is given by way of example and with reference to the accompanying drawings, and in which.

DESCRIPTION OF THE PREFERRED EMBODIMENTS

Figure 1:
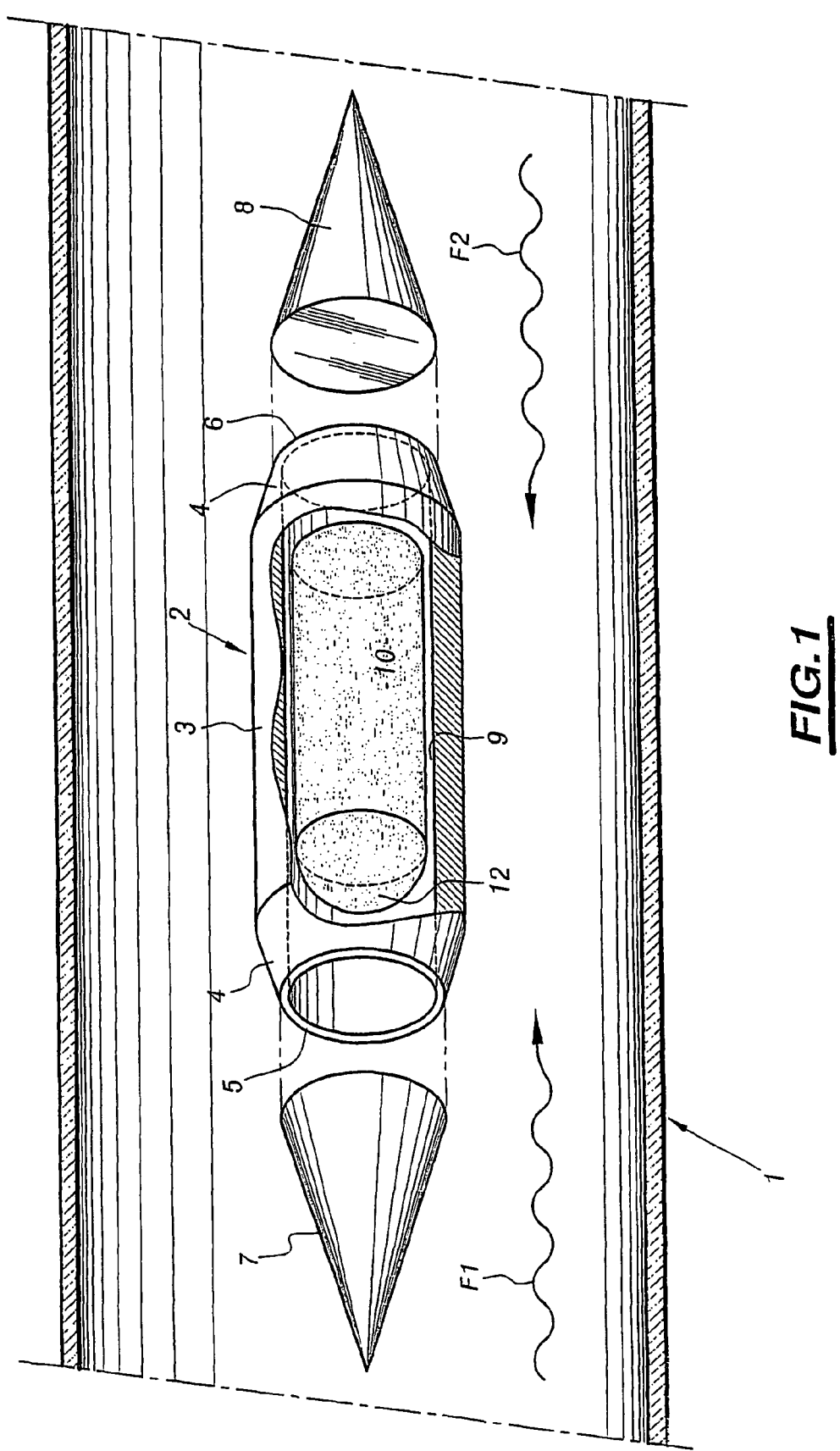
FIG. 1 is an exploded schematic perspective view of a first embodiment of an applicator with impedance adapter according to the invention.

An applicator for the microwave heating of a cylindrical object is shown schematically in exploded perspective in FIG. 1.

The applicator comprises a metal tube 1 forming a waveguide in which is disposed an adapter having a tube 2 of a diameter smaller than that of the applicator and comprising an intermediate portion 3 of cylindrical external shape and two end portions 4 with the external shape of a truncated cone tapering away from the intermediate portion 3.

The two ends 5, 6 of the portions in the shape of truncated cones 4 opposite the intermediate portion 3 are extended by solid cones 7, 8.

The tube 2 has a cylindrical cavity 9 in which a product 10 to be heated is disposed.

This product 10 which extends practically over the length of the tube 1 has a cross-section smaller than the cross-section of the cavity 9 of the tube 2.

It includes an end portion 12 for example of hemispherical shape, or of any shape.

The parts 2, 7 and 8 are joined side by side.

The solid cones 7, 8 form interface adapters, whilst the tube 2 forms a propagation adapter.

Although in the embodiment according to FIG. 1 the intermediate rotational portion 3 has an external surface of cylindrical shape, this external surface may be formed by truncated cones joined by their large bases or by their small bases.

The contours of the external surface of the tube which are thus obtained make it possible to adapt the propagation of the waves with a view to obtaining a uniformity of heating of the treated part over all of its length.

The adapter 3, 7, 8 is placed in the applicator 1 on supports (not shown) disposed in such a way that their interfaces are parallel to the electric field of the propagating wave in the applicator.

The adaptation means are produced from materials of which the permittivity is as close as possible to the average permittivity of the parts to be heated at the very least in the central part of these adaptation means according to the characteristics of the chosen propagation mode or modes.

The materials from which these adaptation means are made are essentially composite materials of which the matrix can be easily used by moulding or by machining.

These materials are for example silicones, PTFE, polyolefins.

The charge of the matrix, principally mineral, can be easily adjusted and has interesting dielectric properties.

The charge materials are for example mica, alumina, titanium oxide, glass, quartz.

The directions of propagation of the waves are indicated by the arrows F1 and F2.

It is possible to choose to use waves which propagate in one or the other direction indicated by the arrows F1 and F2 or even in the two directions simultaneously.

It is equally possible to choose that the waves propagate alternately in the directions of the arrows F1 and F2 if the attenuation of the waves is low.

Figure 2:
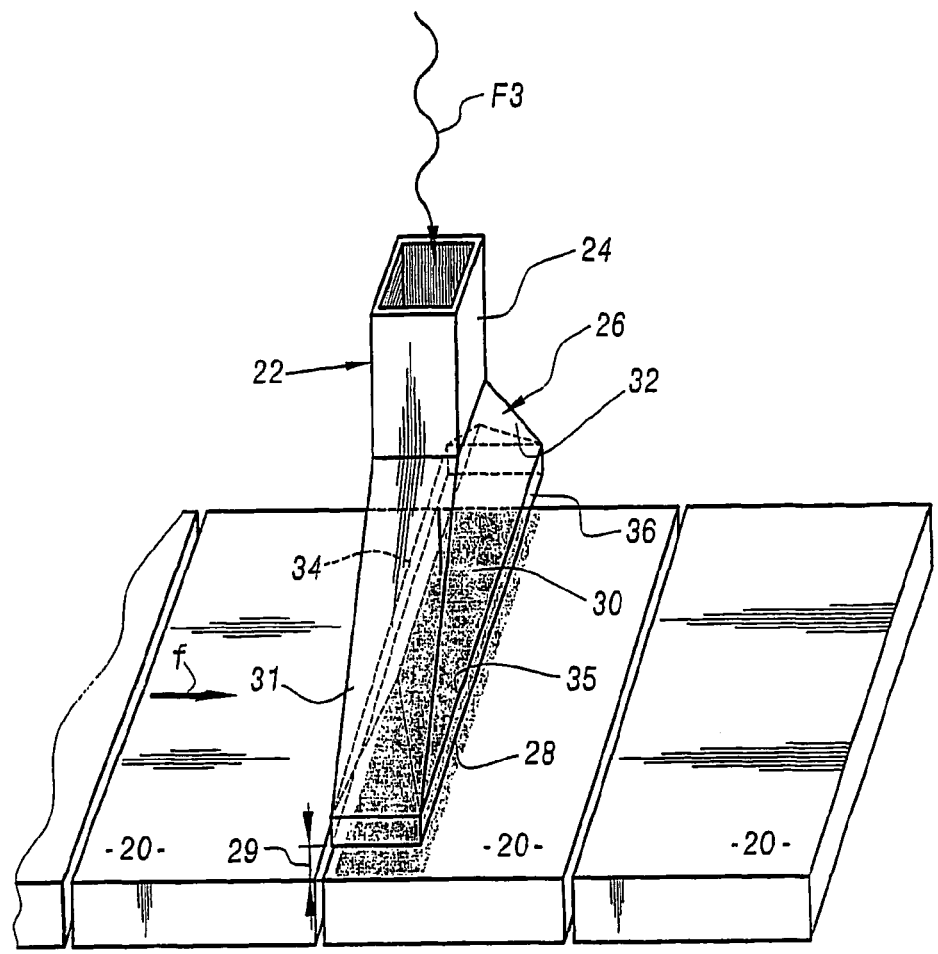
FIG. 2 is a schematic perspective view of another embodiment of the applicator with impedance adapter according to the invention.

According to the embodiment shown in FIG. 2, the products to be heated 20 are products in parallelepipedal blocks of great thickness which can be displaced on or under the microwave heating device or even in it.

This heating device comprises an applicator 22 formed by a rectangular waveguide 24 terminated by a hollow metal prismatic antenna 26.

In the present example, the rectangular end 28 of the antenna 26 turned towards the product 20 to be heated is separated from the product by an air gap 29 which contributes to the adaptation of the interface of the product and which is necessary in order to render the product accessible to other treatments such as surface cooling by circulation of a fluid or some other.

In the hollow prismatic antenna 26 there is accommodated an interface adapter in the shape of a solid prism 30 of which the end faces 31, 32 are joined by a ridge 34 and of which the base 35 is extended in a parallelepipedal portion 36. This parallelepipedal portion is flush with the rectangular end 28 of the antenna 26.

The interface adapter surface 30 which is turned towards the product and which is flush with the end 28 of the antenna 26 can also be in contact with the surface of the parallelepipedal object 20 to be heated.

The direction of propagation of the waves is indicated by the arrow F3.

During the displacement of the applicator 22 in the direction of the arrow f along the products 20 to be heated, the said products are heated by successive zones delimited by the dimension of the antenna 26.

Although the device of FIG. 2 comprises a single waveguide applicator disposed above the objects 20 to be treated, it is possible to provide a plurality of applicators disposed side by side along the displacement path of the objects. It is equally possible to dispose one or several applicators of this type below the objects 20.

Figure 3:
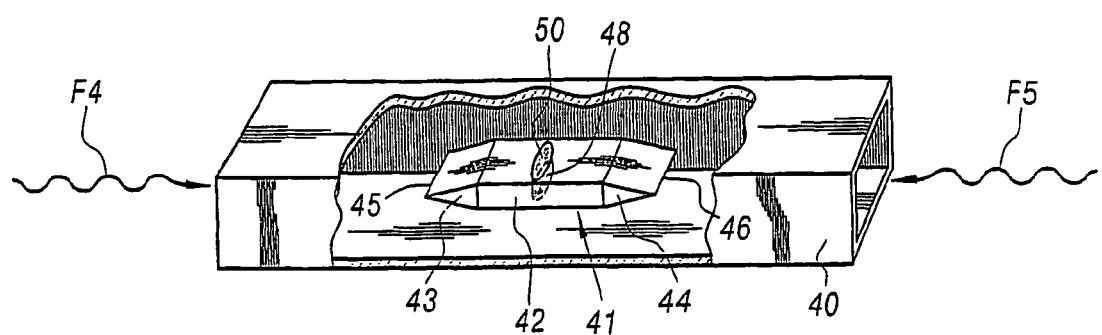
FIG. 3 is a schematic perspective view of another embodiment of the applicator with impedance adapter according to the invention.

The applicator shown in FIG. 3 comprises a rectangular waveguide 40 in which is disposed an adapter 41 having an intermediate portion of parallelepipedal shape 42 and two prismatic tips 43, 44 which are joined by their bases to the ends of the intermediate portion 42 and of which the ridges 45, 46 opposite the said bases are disposed transversely with respect to the direction of propagation of the waves in the wave guide 40.

As in the example of FIG. 1, the waves can propagate in the guide 40 in the two directions indicated by the arrows F4 and F5 alternately or simultaneously.

A cavity is provided in the central portion 42 of the adapter and in this cavity an object to be heated 50 is placed which is of a shape complementary to that of the cavity.

The prismatic tips 43 and 44 form interface adapters.

The choice of the arrangement of the said prismatic tips forming interface adapters is guided by the interfaces producing the most intense reflection.

Thus prismatic adapters placed in a higher or lower position relative to the objects are entirely conceivable.

In the lower position, the adapters can form part of the means for supporting the objects to be heated.

In other cases, these adapters will be an integral part of conveyor means such as belts, belt conveyors, removable bases or others.

Figure 4:
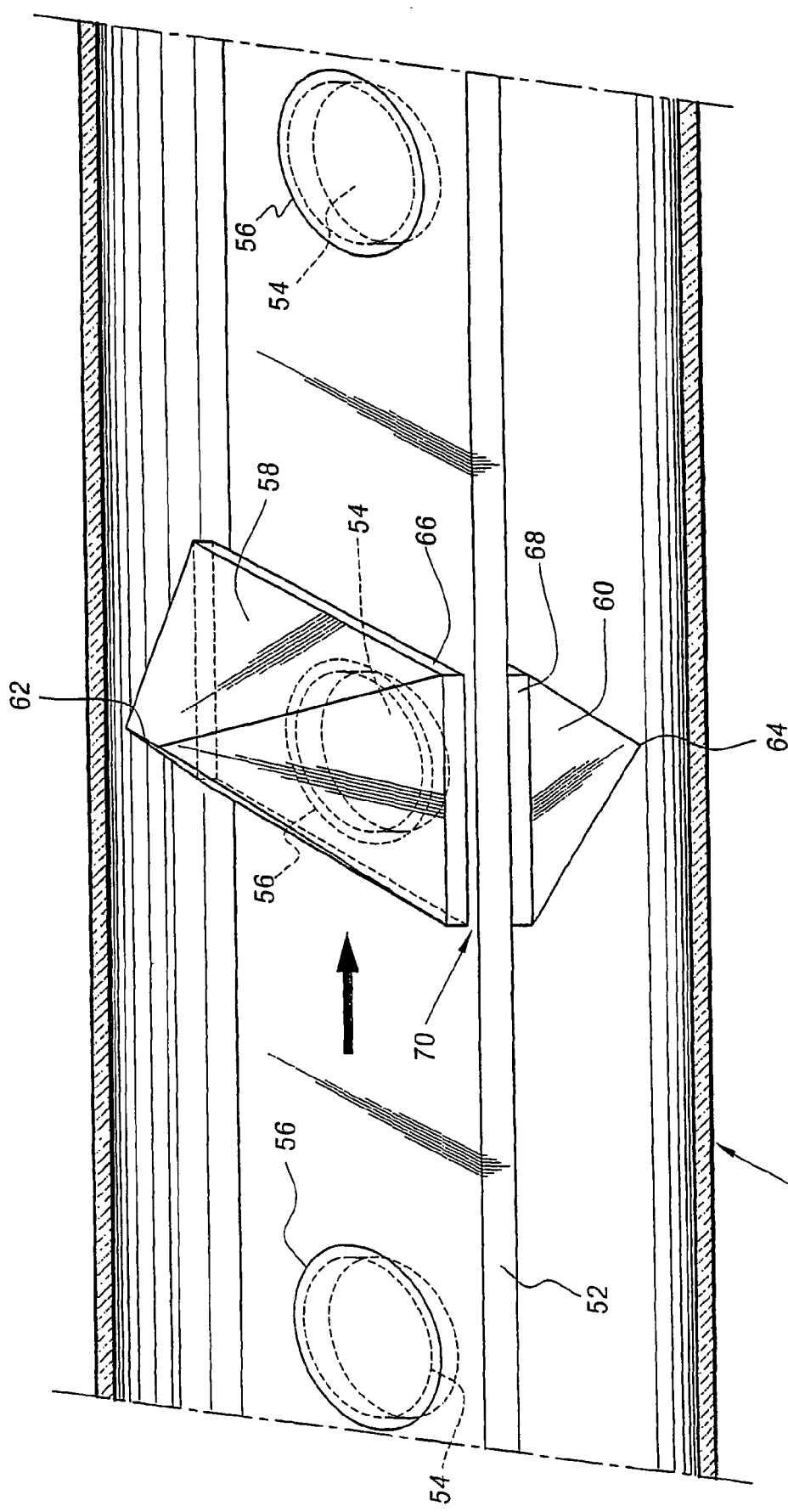
FIG. 4 is a schematic perspective view of yet another embodiment of the applicator with impedance adapter according to the invention.

FIG. 4 shows schematically in perspective an embodiment of a device for microwave treatment of objects according to the invention which includes, mounted in an applicator 51, a belt conveyor 52 in which cells 54 are provided for objects to be treated by microwaves such as trays 56 for food products.

The conveyor, of which only the portion inside the applicator is shown, is made from a material having a dielectric permittivity adapted to the heat treatment of the contents of the trays 56.

Interface adapters 58, 60, placed above and below the belt 52 are disposed on the path of the conveyor 52. These interface adapters are formed by pyramids each having a tip in the form of a ridge 62, 64 and facing one another with their bases 66, 68.

The belt 52 is moved in the gap 70 provided in the interface adapters 58 and 60.

It will be seen in this embodiment that the interface adapters 58, 60 are oriented in a general normal direction to the direction of movement of the objects 56 on the conveyor belt 52.

This orientation of the interface adapters is in this case, bearing in mind the shape and the arrangement of the objects 56, the optimum orientation in which the interfaces 58, 60 produced the most intense reflection.

The arrangement of the tips forming adapters can therefore be chosen with respect to the objects to be treated in at least one of the three dimensions in space.

In the devices which have just be described with reference to the drawings, in order to favour the propagation in the object to be heated it is possible to produce at least certain of the dielectric adaptation means by association of several dielectric materials of different permittivities, thus creating a multilayer structure which makes it possible to ensure control of the attenuation of the waves.

Such a multilayer structure makes it possible in particular to improve the performances of the propagation adapters.

In the case of the use of such multilayer structures, it is the central layer which has a dielectric permittivity close to the average permittivity of the object to be heated.

The fields of use of the dielectric equipment according to the invention are those where the raising of the temperature of the objects in a uniform manner in space is essential.

These are first and foremost products of the farm food industries for which food safety requires that the range of temperature necessary for defrosting, pasteurisation, even sterilisation should be uniform in space.

They may also be technical products.

It is possible to envisage the curing of objects made from thermosetting resin when it is not necessary to use a mould with application of a mechanical pressure.

Thus the invention is advantageously used for heating glues, coating products, reactive products stored at low temperature (−70° C. to −20° C.) and up to ambient temperature or the temperature of use.

What is claimed is:

1. Device for microwave treatment of objects in an applicator, comprising, disposed in the applicator, dielectric impedance adaptation means, said dielectric means having on the one hand a shape complementary to that of the objects to be treated and on the other hand at least one projecting end with a pointed cross-section, said projecting end being exposed to microwave radiation, and the dielectric adaptation means are parts made from a dielectric material of which the permittivity is as close as possible to average permittivity of the objects to be heated.

2. Device for treatment of objects as claimed in claim 1, wherein the dielectric adaptation means have volumes of which a base is equal to at least a part of a section of the object to be heated and of which the height is limited to the filling conditions of the applicator.

3. Device for treatment of objects as claimed in claim 1, wherein said dielectric means comprise tips forming interface adapters disposed relative to the object to be treated according to at least one of the three dimension in space.

4. Device for treatment of objects as claimed in claim 2, wherein the dielectric adaptation means comprise a tube having a cylindrical internal cavity and an external shape having an intermediate rotational portion and two end portions in the shape of truncated cones tapering away from the rotational portion and, joined to the ends of the tube forming a propagation adapter, solid conical parts which form interface adapters.

5. Device for treatment of objects as claimed in claim 4, wherein the intermediate rotational portion has a cylindrical external shape.

6. Device for treatment of objects as claimed in claim 4, wherein the intermediate rotational portion is formed by truncated cones joined by the large bases or by their small bases.

7. Device for treatment of objects as claimed in claim 2, for the heating of objects of parallelepipedal shape, wherein it comprises at least one waveguide extended by a prismatic antenna disposed on the side of at least one face of at least one object, and the dielectric adaptation means comprise a prismatic part accommodated in said at least one antenna.

8. Device for treatment of objects as claimed in claim 7, wherein the free surface of the prismatic dielectric part is situated in contact with the corresponding face of the parallelepipedal object to be heated.

9. Device for treatment of objects as claimed in claim 7, wherein when said at least one object is to remain accessible for other operations, an air gap is provided between said adaptation means and the surface of said object of parallelepipedal shape, the value of said air gap being a function of the dielectric permittivities of the material of the object to be heated and of the dielectric adaptation means.

10. Device for treatment of objects as claimed in claim 9, wherein the value of the air gap is less than or equal to a whole number of half-wavelengths of the propagation mode.

11. Device for treatment of objects as claimed in claim 2, wherein the dielectric adaptation means comprise an intermediate portion of parallelepipedal shape in which an impression is provided for the object to be heated, and two prismatic tips which are joined by their bases to the ends of the intermediate portion and of which the ridges opposite said bases are disposed transversely with respect to the direction of propagation of the waves with respect to said dielectric adaptation means, said prismatic tips forming interface adapters.

12. Device for treatment of objects as claimed in claim 1, wherein in order to favour the propagation in the object to be heated, several dielectric materials of different permittivities are associated, thus creating a permittivity gradient.

13. Device for treatment of objects as claimed in claim 12, wherein, when the dielectric parts of said adaptation means are formed by layers of different materials, the permittivity of the central layer has a value close to that of the objects to be heated.

14. Device for treatment of objects as claimed in claim 1, wherein it comprises, disposed in said applicator, a conveyor belt made from a material having a dielectric permittivity adapted to the objects to be treated, said conveyor belt being displaceable in a gap defined by the bases of interface adapters which are placed above and below the belt and have cells to receive objects to be treated by microwaves such as trays for food products.

15. Device for treatment of objects as claimed in claim 2, wherein said dielectric means comprise tips forming interface adapters disposed relative to the object to be treated according to at least one of the three dimension in space.

16. Device for treatment of objects as claimed in claim 3, wherein the dielectric adaptation means comprise a tube having a cylindrical internal cavity and an external shape having an intermediate rotational portion and two end portions in the shape of truncated cones tapering away from the rotational portion and, joined to the ends of the tube forming a propagation adapter, solid conical parts which form interface adapters.

17. Device for treatment of objects as claimed in claim 3, for the heating of objects of parallelepipedal shape, wherein it comprises at least one waveguide extended by a prismatic antenna disposed on the side of at least one face of at least one object, and the dielectric adaptation means comprise a prismatic part accommodated in said at least one antenna.

18. Device for treatment of objects as claimed in claim 3, wherein the dielectric adaptation means comprise an intermediate portion of parallelepipedal shape in which an impression is provided for the object to be heated, and two prismatic tips which are joined by their bases to the ends of the intermediate portion and of which the ridges opposite said bases are disposed transversely with respect to the direction of propagation of the waves with respect to said dielectric adaptation means, said prismatic tips forming interface adapters.

19. Device for treatment of objects as claimed in claim 2, wherein it comprises, disposed in an applicator, a conveyor belt made from a material having a dielectric permittivity adapted to the objects to be treated, said conveyor belt being displaceable in a gap defined by the bases of interface adapters which are placed above and below the belt and have cells to receive objects to be treated by microwaves such as trays for food products.

20. Device for treatment of objects as claimed in claim 3, wherein it comprises, disposed in an applicator, a conveyor belt made from a material having a dielectric permittivity adapted to the objects to be treated, said conveyor belt being displaceable in a gap defined by the bases of interface adapters which are placed above and below the belt and have cells to receive objects to be treated by microwaves such as trays for food products.

21. Device for the treatment of objects as claimed in claim 1, wherein the projecting end being exposed to microwave radiation forms an interface adapter.

22. Device for the treatment of objects as claimed in claim 1, wherein the dielectric impedance adaptation means are made of dielectric materials of variable thickness or permittivity characteristics in the microwave propagation direction.

* * * * *